Jan. 28, 1936.  J. W. JENNINGS  2,028,870
SALT SHAKER OR THE LIKE
Filed Aug. 24, 1935

Inventor
James W. Jennings
By Horatio E. Bellows
Attorney

Patented Jan. 28, 1936

2,028,870

UNITED STATES PATENT OFFICE 2,028,870

SALT SHAKER OR THE LIKE

James W. Jennings, Providence, R. I.

Application August 24, 1935, Serial No. 37,617

1 Claim. (Cl. 65—45)

My present invention relates to a shaker for salt and other condiments, and has particular reference to the type having outflow openings located in the upper portion of the shaker, the outflow area usually being convexo-concave or transversely curved.

It is well known that atmospheric moisture permeates the contents of condiment holders and causes cohesion of the contained particles, this being particularly true with salt, which absorbs moisture. Grains or particles of salt and other condiments when moist have a tendency to clog the outflow openings and prevent free discharge through the outflow openings heretofore provided in these devices. The principal objects of my invention are to prevent clogging of the outflow openings and to facilitate outflow of the condiment at all times and under any atmospheric condition.

With the above and other novel objects and advantageous features in view, my invention consists of a novel arrangement of parts more fully disclosed in the detailed description following, in conjunction with the accompanying drawing, and more specifically defined in the claim appended thereto.

Referring to the drawing.

Figure 1:
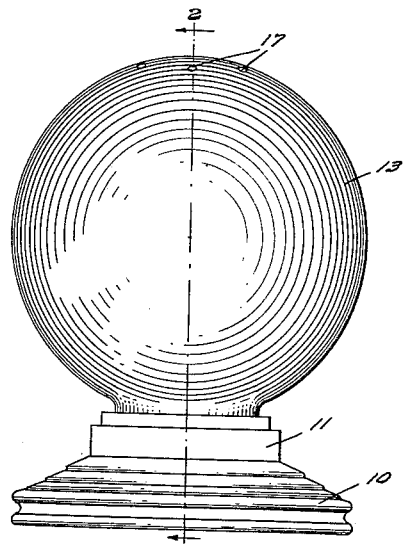
Fig. 1 is a front elevation of the novel condiment holder.

Referring to the drawing, the condiment holder or shaker includes a base 10, preferably made of metal, and provided with a socket 11 in the upper portion thereof having a screw thread 12 formed therein. A condiment container 13, preferably made of glass or other vitreous material, which may be of any desired form or shape and is illustrated as spherical, has a shank 14 which is threaded as at 15 for locking engagement with the threads 12 of the socket 11. When using a metal base, it is preferred to place a disk 16 of non-corrosive material between the shank 14 and the end of the socket 12 to eliminate any corrosive action on the metal base.

Figure 3:
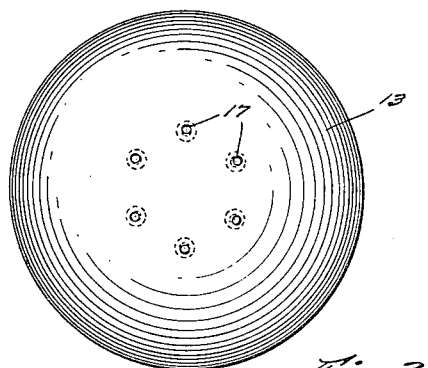
Fig. 3 is a top plan view of Fig. 1.
Figure 4:
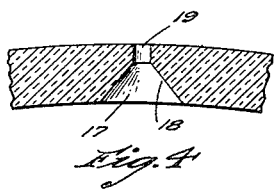
Fig. 4 is an enlarged sectional detail showing the type of outflow openings preferred for glass and vitreous material.

Referring now to Figs. 3 and 4, the container 13 is provided with a plurality of outflow openings 17 at the upper portion thereof, these outflow openings in the case of vitreous material being formed as indicated in Fig. 4, namely with tapered sides 18 leading to a small outflow orifice 19, preferably of cylindrical form. With this construction salt or another condiment within the container has a large entrance area feeding into an outlet orifice of relatively small dimensions, thus eliminating any tendency for the condiment to clog the opening, as the condiment freely flows back out of the tapered portion when the shaker is replaced on its base. The shaker is filled by unscrewing the container from the base, and filling the container through the shank opening, the discharge outlets being covered in any suitable manner, as by the hand, during the filling operation.

The construction shown in Fig. 4 is preferred to prevent chipping or flaking of the glass or other vitreous products during drilling of the openings.

Figure 2:
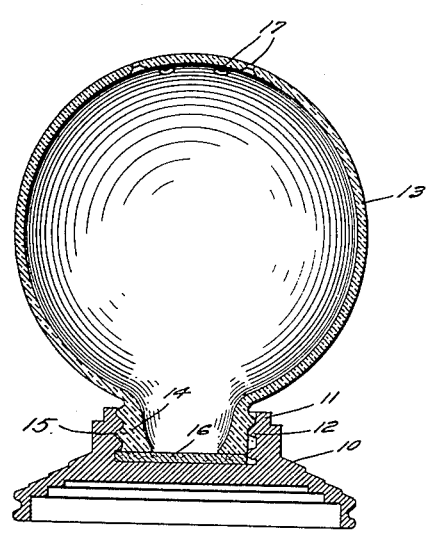
Fig. 2 is a vertical section thereof on the line 2—2 of Fig. 1.
Figure 5:
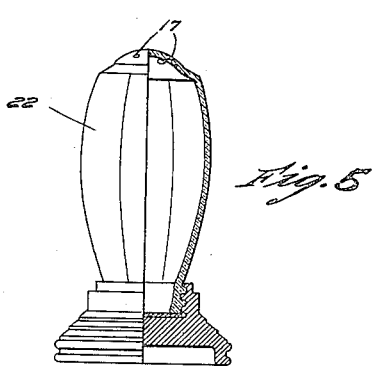
Fig. 5 is a front elevation, partly in section, showing a modified construction of condiment holder embodying the novel invention.

If desired, the form of the container may be varied, an illustrative alternative form being shown at 22 in Fig. 5, the outflow openings being of the form shown in Fig. 4. Preferably, the outflow openings are positioned in a curved discharge portion as disclosed in Figs. 2 and 5, and arranged with the axes thereof passing through the open end 14 but the discharge area may be of any shape desired, the essential feature of the invention residing in the construction of a non-clogging outflow opening which prevents adherence of the condiment to the sides of the opening and facilitates movement of condiment away from the outflow openings after the shaker has been used.

While I have described a specific constructional embodiment of my invention, it is obvious that desired changes in the proportions and shape of the parts, in the material used for the various parts, and in their relative positioning, may be made without departing from the spirit and the scope of the invention as defined in the appended claim.

I claim:

A shaker comprising a base and a condiment container of vitreous material having an open lower end detachably secured to said base and normally disposed in upright position above the base, said container having a top with a plurality of sifting openings therein, each of said openings having the major portion thereof approximately frustro-conical and tapering to a relatively small cylindrical outer end portion of less than one-half the length of the opening and of appreciably smaller diameter than the inner end of the opening, the tapered major portion preventing clogging of the condiment in the container, the openings being arranged with the axes thereof passing through the open end of the container.

JAMES W. JENNINGS.